United States Patent [19]
Wood

[11] Patent Number: 5,691,813
[45] Date of Patent: Nov. 25, 1997

[54] VALVE POSITION SENSOR

[75] Inventor: Christopher Wood, Aylesford, England

[73] Assignee: Lucas Industries public limited Co., Great Britain

[21] Appl. No.: 501,551

[22] Filed: Jul. 12, 1995

[30] Foreign Application Priority Data

Jul. 30, 1994 [GB] United Kingdom ............. 9415446

[51] Int. Cl.$^6$ ................................................ G01B 11/14
[52] U.S. Cl. ................................ 356/375; 250/559.31
[58] Field of Search ................................ 356/373, 375; 250/221, 222.1, 559.29, 559.31, 559.4

[56] References Cited

U.S. PATENT DOCUMENTS

| | | |
|---|---|---|
| 4,452,074 | 6/1984 | Shelomentsev et al. |
| 5,231,469 | 7/1993 | Jeffers et al. ............. 356/373 |

FOREIGN PATENT DOCUMENTS

| | | | |
|---|---|---|---|
| 2 138 072 | 10/1984 | United Kingdom . | |
| 2 159 942 | 12/1985 | United Kingdom . | |
| 2159942 A | 12/1985 | United Kingdom | 356/373 |
| 92/14991 | 9/1992 | WIPO . | |

*Primary Examiner*—F. L. Evans
*Attorney, Agent, or Firm*—Andrus, Sceales, Starke & Sawall

[57] ABSTRACT

A position sensor for monitoring the position of the valve element of a valve is described. The sensor comprises reflector means associated with the valve element and arranged to reflect energy, for example visible light, from a suitable source such that when the valve element is in a first position the reflected energy is incident upon a detector. Movement of the valve element away from the first position results in the reflected light no longer being incident upon the detector. The invention further relates to a valve including such a position sensor.

9 Claims, 2 Drawing Sheets

VALVE POSITION SENSOR

This invention relates to a position sensor for monitoring the position of the valve element of a valve, in particular, but not exclusively, an electromagnetically operated valve for the delivery of fuel in a diesel fuel injection system.

In order to monitor the delivery of fuel and to ensure that a valve is operating correctly, it is desirable to be able to monitor the position of the valve element. Since the valve element of a valve in a fuel injection system only performs a small amount of movement, detection of such movement is difficult.

According to the present invention there is provided a position sensor for sensing the position of a valve element movable between first and second positions, the position sensor comprising an energy source, reflector means for reflecting energy emitted by the energy source, the reflector means being movable with the valve element and detector means positioned to detect the reflected energy when the valve element is in its first position.

Where the valve comprises an electromagnetically operated valve, the reflector means preferably comprises a reflective surface provided on the armature associated with the valve element.

The energy source is preferably arranged to emit energy in a direction parallel to the direction of movement of the valve element, the energy reflected by the reflector means, in use, preferably being reflected at an angle to the incident energy.

The energy source conveniently comprises a source of electromagnetic radiation, for example visible light or infrared radiation. Alternatively, the energy may be in the form of sound.

The invention will further be described by way of example with reference to the accompanying drawings, in which.

Figure 1:
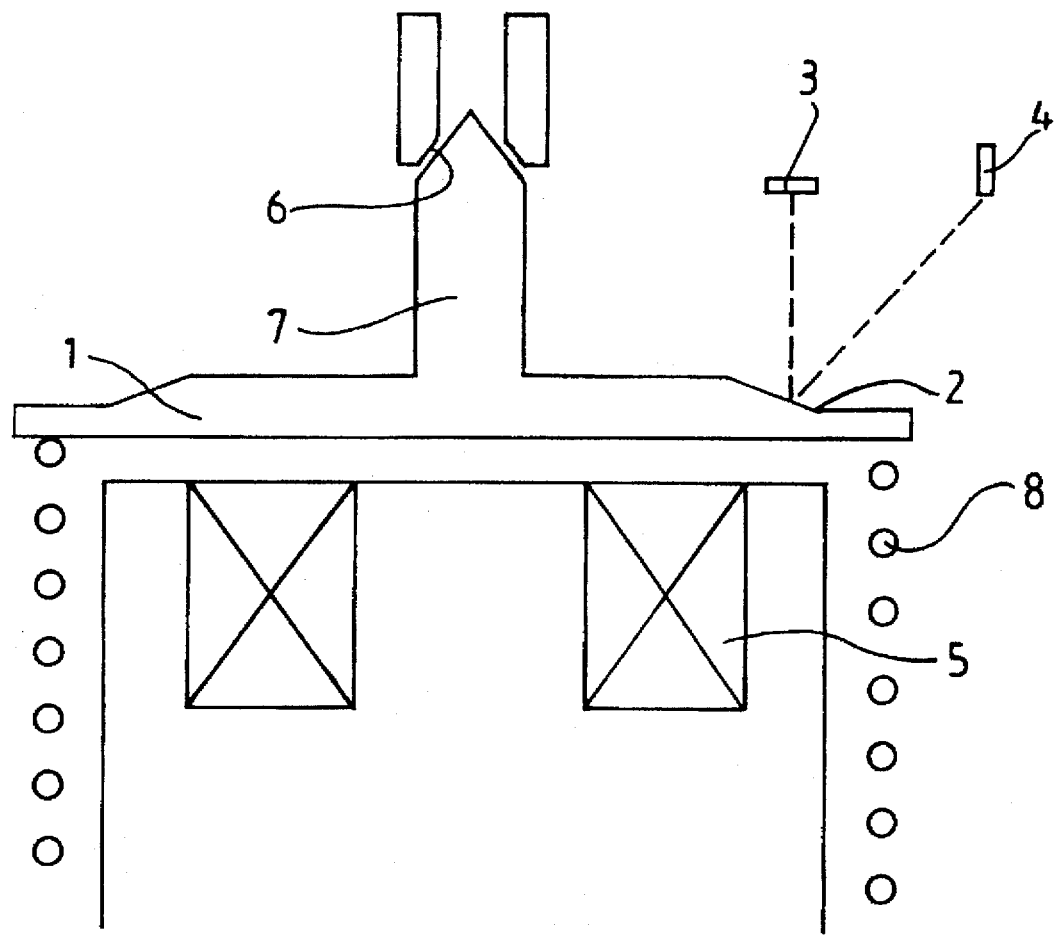
FIG. 1 is a diagrammatic view of a valve.
Figure 2:
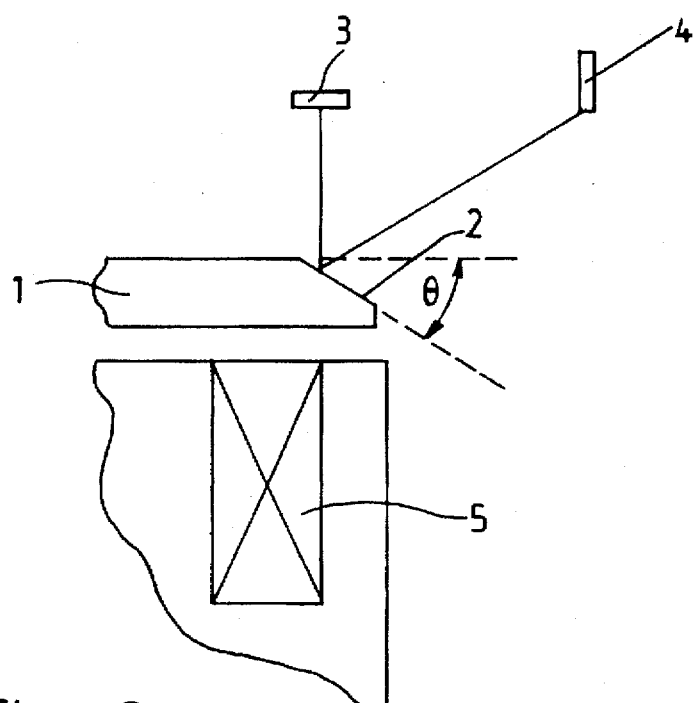
FIG. 2 is a diagrammatic view of part of the valve of FIG. 1 including a position sensor in accordance with an embodiment of the invention.
Figure 3:
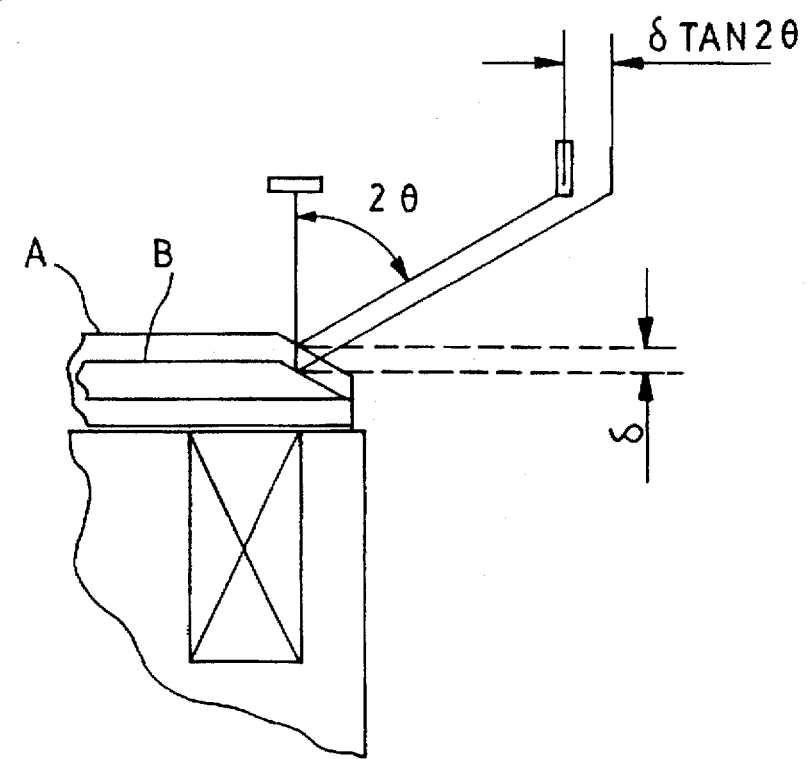
FIG. 3 is a view similar to FIG. 2 showing the extreme positions of the valve element.

The valve illustrated in FIGS. 1 to 3 is an electromagnetically operated valve which comprises a valve seat 6 against which a valve element 7 is engageable. Means for biasing the valve element 7 towards or away from the valve seat 6 in order to bias the valve towards a closed or an open position may be provided, such means comprising, for example, a helical spring 8. The valve includes a movable armature 1 movable under the influence of a magnetic field generated by a coil 5 such that when a current flows in the coil 5, the armature 1 moves under the influence of the magnetic field induced thereby. The valve element is arranged to be moved by movement of the armature 1, the biasing means associated with the valve element acting against the action of the coil 5 to return the armature 1 and valve element on removal or reduction of the current applied to the coil 5. Thus in the case of a valve element biased towards a closed position, the provision of a current flowing in the coil 5 results in the valve opening, a reduction in the current resulting in the closure or partial closure of the valve.

The surface of the armature 1 facing away from the valve seat includes a region 2 which is reflective to visible light, the reflective region 2 being inclined to the direction of movement of the armature 1 to define an angle θ with a line perpendicular to the said direction of movement.

A suitable source 3 of visible light is arranged to emit light in a direction parallel to the direction of movement of the armature 1 so as to be incident upon the reflective region 2, the light reflected by the reflective region 2 being incident, in use, upon a suitable detector 4 when the valve element is in its open position, ie spaced from the valve seat. It will be recognised that the reflected light beam is at an angle 2θ to the incident ray. On movement of the armature 1 away from the position illustrated in FIG. 2, the reflected ray is moved laterally, and a point will be reached beyond which the reflected light is no longer incident upon the detector. The detected light intensity will therefore drop, providing an indication that the valve element is no longer in its fully open position.

On returning to its fully open position, the reflective surface 2 of the armature 1 will reflect the light in such a manner that it is incident upon the detector 4. The detected light intensity will then rise, providing an indication that the valve is again in its fully open position.

It will be recognised that by adjusting the position of the detector 4 with respect to the armature 1, the above described apparatus may be used to provide an indication of when the valve element is in its closed position or any other desired position rather than in its fully open position. If desired, a second detector could be provided enabling an indication to be provided of when the valve element is in its fully open position or its closed position.

As shown in FIG. 3, for movement of the armature 1 by a distance δ from position A to position B, the position at which the reflected ray is intended to be detected shifts by a distance δtan2θ. Therefore, if the reflective surface is at an angle of 40°, the movement of the armature 1 is amplified by a factor of 5.67 enabling the position of the armature, and hence the valve element to be accurately monitored. The angle of the reflective region may be adjusted in order to vary the amplification of the sensor. In addition, although the described embodiment is arranged to emit light in a direction parallel to the direction of movement of the armature 1, the incident light may be emitted in other direction further varying the amplification of the position sensor.

I claim:

1. A position sensor for sensing the position of a valve element movable in a first direction between first and second positions, the position sensor comprising an energy source for emitting an energy beam in a direction parallel to the first direction, reflector means for reflecting the energy beam, the reflector means being movable with the valve element and inclined to the first direction, and detector means for detecting the position of the reflected energy beam, the detector means being located to sense the reflected energy beam when the valve element occupies its first position, the detector means being sensitive to the intensity of the reflected energy beam at that location.

2. A sensor as claimed in claim 1, further comprising an armature associated with the valve element, the reflector means comprising a reflective surface provided on the armature.

3. A sensor as claimed in claim 1, wherein the energy is reflected at an angle to the incident energy.

4. A sensor as claimed in claim 1, wherein the energy source comprises a source of electromagnetic energy.

5. A sensor as claimed in claim 4, wherein the energy is visible light.

6. A sensor as claimed in claim 4, wherein the energy is an infrared wave.

7. A sensor as claimed in claim 1, wherein the energy is in the form of a sound wave.

8. A valve including a valve seat and a valve element engageable with the seat and moveable in a first direction between first and second positions, comprising a position sensor for sensing the position of the valve element, the position sensor comprising an energy source for emitting an energy beam in a direction parallel to the first direction, reflector means for reflecting the energy beam, the reflector means being moveable with the valve element and inclined to the first direction, and detector means for detecting the position of the reflected energy beam, the detector means being located to sense the reflected energy beam when the valve element occupies its first position, the detector means being sensitive to the intensity of the reflected energy beam at that location.

9. A valve as claimed in claim 8, wherein the valve element is biased into engagement with the valve seat.

* * * * *